United States Patent [19]

Iida

[11] Patent Number: 5,370,098
[45] Date of Patent: Dec. 6, 1994

[54] AIR INTAKE SYSTEM FOR GAS FUELED ENGINE

[75] Inventor: Yoshikatzu Iida, Iwata, Japan

[73] Assignee: Yamaha Hatsudoki Kabushiki Kaisha, Iwata, Japan

[21] Appl. No.: 129,014

[22] Filed: Sep. 24, 1993

Related U.S. Application Data

[63] Continuation of Ser. No. 869,373, Apr. 16, 1992, abandoned.

[30] Foreign Application Priority Data

Apr. 20, 1991 [JP] Japan .................................. 3-116992
Apr. 20, 1991 [JP] Japan .................................. 3-116993

[51] Int. Cl.⁵ ....................... F02B 43/00; F02B 31/00; F02M 21/04
[52] U.S. Cl. .................... 123/52.7; 123/306; 123/188.7
[58] Field of Search ............ 123/527, 306, 308, 188.7, 123/432, 672, 52 MB, 525

[56] References Cited

U.S. PATENT DOCUMENTS

| | | | |
|---|---|---|---|
| 4,059,415 | 11/1977 | Kosaka et al. | 123/3 |
| 4,111,161 | 9/1978 | Ueno et al. | 123/527 |
| 4,263,882 | 4/1981 | Tezuka et al. | 123/432 |
| 4,285,700 | 8/1981 | Fox | 123/527 |
| 4,300,504 | 11/1981 | Tezuka | 123/432 |
| 4,304,211 | 12/1981 | Tezuka et al. | 123/585 |
| 4,346,682 | 8/1982 | Mader | 123/527 |
| 4,381,738 | 5/1983 | Shaffer | 123/432 |
| 4,404,947 | 9/1983 | Swanson | 123/527 |
| 4,494,515 | 1/1985 | Brown | 123/527 |
| 4,553,519 | 11/1985 | Masson | 123/527 |
| 4,638,783 | 1/1987 | Snyder | 123/527 |
| 4,640,234 | 2/1987 | Olsson et al. | 123/308 |
| 4,702,207 | 10/1987 | Hatamura et al. | 123/308 |
| 4,760,821 | 8/1988 | Aupor et al. | 123/308 |
| 4,771,740 | 9/1988 | Koike | 123/52 MB |
| 4,829,957 | 5/1989 | Garretson et al. | 123/527 |
| 4,901,680 | 2/1990 | Matsumoto | 123/308 |
| 4,909,210 | 3/1990 | Shimada et al. | 123/308 |
| 4,930,468 | 6/1990 | Stockhausen | 123/308 |
| 4,932,378 | 6/1990 | Hitomi | 123/432 |
| 4,953,516 | 9/1990 | Van der Weide et al. | 123/527 |
| 5,018,485 | 5/1991 | Washizu et al. | 123/52 MB |
| 5,076,245 | 12/1991 | Jones | 123/527 |
| 5,101,799 | 4/1992 | Davis et al. | 123/527 |
| 5,105,774 | 4/1992 | Piccini | 123/52 MB |
| 5,136,986 | 8/1992 | Jensen | 123/527 |
| 5,140,959 | 8/1992 | Durbin | 123/527 |

FOREIGN PATENT DOCUMENTS

| | | |
|---|---|---|
| 0182223 | 5/1986 | European Pat. Off. . |
| 0346989 | 12/1989 | European Pat. Off. . |
| A3913358 | 10/1990 | Germany . |
| 57-23101 | 5/1982 | Japan . |
| 60-32031 | 7/1985 | Japan . |
| A865413 | 4/1961 | United Kingdom . |
| 2086485 | 5/1982 | United Kingdom . |
| 2139699 | 11/1984 | United Kingdom . |

Primary Examiner—E. Rollins Cross
Assistant Examiner—Thomas N. Moulis
Attorney, Agent, or Firm—Knobbe, Martens, Olson & Bear

[57] ABSTRACT

A number of embodiments of gaseous fueled internal combustion engines having induction systems that include charging augmentation means for altering the charging character of the induction system into the combustion chamber. In some embodiments this charging augmentation means comprises auxiliary intake passages that serve the combustion chamber through the main intake passages and which deliver a charge at a higher velocity. This higher velocity charge may be employed to generate tumble in the combustion chamber. The charge forming system for the engine includes a number of embodiments of systems including a carburetor and a pressure regulator that delivers fuel at a regulated pressure to the carburetor. In some embodiments, fuel is also delivered to the induction system independently of the carburetor.

76 Claims, 13 Drawing Sheets

AIR INTAKE SYSTEM FOR GAS FUELED ENGINE

This is a continuation of United States patent application Ser. No. 07/869,373, filed Apr. 16, 1992, now abandoned.

BACKGROUND OF THE INVENTION

This invention relates to an air intake system for a gas fueled engine and more particularly to an improved induction and charge forming system for an internal combustion engine and particularly one operating on a gaseous fuel.

In the interest of protecting the environment and conserving nature resources, it has been proposed to operate internal combustion engines on a gaseous fuel (L.P.G.). The gaseous fuel is stored under pressure as a liquid in a container and then is delivered to the engine through a regulating and induction system for its operation. In addition to the aforenoted environmental advantages, gaseous fuels tend to promote longer engine life and longer service intervals due to the fact that the burn more cleanly in the combustion chamber of the engine.

However, in order to assure the maximum advantages of gaseous fueled engines, it is desirable to insure that the induction system for the engine has optimum efficiency. For example, it is well known that it is desirable to induce turbulence in the combustion chamber, particularly at low speeds, in order to insure complete and rapid combustion. However, the induction of a turbulent charge into the combustion chamber reduces the volumetric efficiency of the engine and can reduce power outputs at high speeds.

It is, therefore, a principal object to this invention to provide an improved induction system for a gas fueled internal combustion engine that permits the generation of turbulence in the combustion chamber at low speeds without adversely effecting volumetric efficiency at high speeds.

In addition to the differences required for induction at low speed and high speed operations, there are a number of a various other running conditions of the engine which dictate differences in the performance of the induction system depending upon the actual speed and load of the engine. Devices which may operate to assist under one running condition, can be detrimental under another running condition. Therefore, induction systems employed with gas fueled engines have tended to be a compromise in order to operate satisfactorily, but less than most efficiently, under all conditions.

It is, therefore, a further object of this invention to provide an improved induction system and charge forming system for an internal combustion engine operated on a gaseous fuel wherein the induction system can be tailored to provide different charging effects under different running conditions.

As with other types of fuel on which internal combustion engines operate, it is necessary to mix the fuel with air so as to provide a stoichiometric mixture within the combustion chamber that can be easily ignited and which will burn efficiently and completely. It has generally been the practice to employ a charge former such as a carburetor for mixing the gaseous fuel with atmospheric air for delivery to the engine through its induction system. The gaseous fuel is supplied to the charge former from a source in which the fuel is stored under pressure as a liquid and a regulator is employed in the system between the source and the charge former. As with other forms of fuel, the charge former must provide good air and fuel mixing under all running conditions. This generally necessitates the formation of compound or plural discharge circuits in the carburetor. For example, it is conventional to employ an idle discharge circuit and a main fuel discharge circuit. Such carburetors are employed conventionally with gaseous fueled engines.

However, when operating with gaseous fuel there are some instances when it is not desirable to perform all of the fuel and air mixing within the charge former. That is, if all of the fuel/air mixing is accomplished within the charge former, the performance of the engine under running conditions such as idle or low speed operation or transient conditions may not be optimum.

It is, therefore, a still further object to this invention to provide an improved induction and charge forming system for a gaseous fueled engine wherein not all of the fuel is mixed with the air in the charge former.

It is a further object to this invention to provide an improved charge forming and induction system for a gaseous fueled engine wherein a major portion of the fuel/air mixing takes place in the charge former and other running conditions are accommodated by provided fuel at a supplemental location in the induction system.

One running condition that provides difficulty in insuring good fuel/air mixing and adequate fuel in the combustion chamber for combustion is during acceleration. Gaseous fuels like liquid fuels do not accelerate as rapidly as air flow when the engine is rapidly accelerated. This is due to the more dense nature of the fuel than the air. In order to reduce the likelihood of lean running, it is desirable to provide some additional fuel enrichment during the initial period when the throttle valve of the engine is rapidly opened.

These problems become even more acute when the acceleration takes place at the end of a long period of deceleration or at the end of a rapid deceleration. When the engine is being decelerated, the throttle valve is generally closed and little or no fuel is supplied. As a result, the area between the throttle valve and the combustion chamber will be depleted of fuel. Thus, when the throttle valve is rapidly opened, although the air flow may increase, it will take a long time for the fuel to reach the combustion chamber and poor running can occur.

It is, therefore, a still further object to this invention to provide an improved arrangement for supplying accelerating fuel to a gaseous fueled engine wherein lags in performance under acceleration are avoided.

SUMMARY OF THE INVENTION

A first feature of this invention is adapted to be embodied in an induction system for a gas fueled internal combustion engine having a combustion chamber. A source of gaseous fuel stored under pressure as a liquid is incorporated. An induction system inducts atmospheric air and delivers a charge to the combustion chamber. A regulator and charge forming means changes fuel from the source into a gaseous form, regulates its pressure and charges the fuel into the induction system for mixing with air. In accordance with this feature of the invention, charging augmentation means are provided in the induction system for selectively altering the charging character of the induction system into the combustion chamber.

Another feature of the invention is adapted to be embodied in an induction system for an internal combustion engine having a combustion chamber. At least a pair of main intake ports deliver a charge to the combustion chamber and at least a pair of auxiliary intake ports each open into a respective one of the main intake ports for delivering a charge to the combustion chamber through the main intake ports. The auxiliary intake ports are substantially smaller in effective cross sectional area so that a charge issuing therefrom will enter the combustion chamber at a higher velocity then from the main intake ports. The auxiliary intake ports are directed so that the charge issuing therefrom moves toward intersection as it enters the combustion chamber.

Another feature of the invention is adapted to be embodied in an induction and charge forming system for a gaseous fueled internal combustion chamber that has a combustion chamber in which includes a source of gaseous fuel stored under pressure as a liquid. An induction system is incorporated for inducting atmospheric air and delivering a charge to the combustion chamber. A charge former in the induction system has a main fuel feed system and a throttle valve. Means are provided for delivering fuel from the source to the main fuel feed system of the charge former for combustion in the combustion chamber. Means are also provided for delivering fuel from the source to the induction system at a location other than the charge former.

DETAILED DESCRIPTION OF THE PREFERRED EMBODIMENTS OF THE INVENTION

Figure 1:
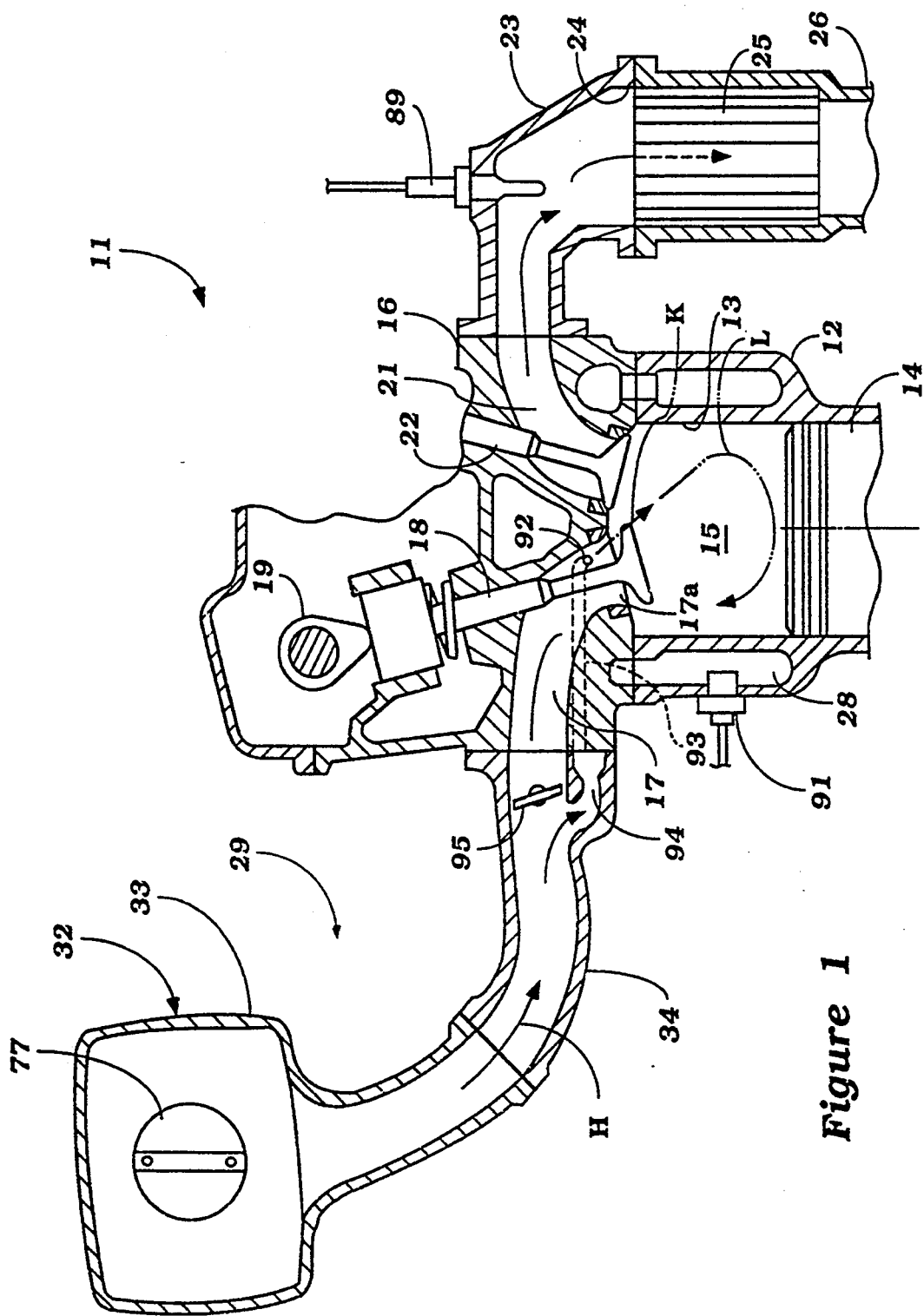
FIG. 1 is a cross sectional view taken through a portion of an internal combustion engine constructed in accordance with a first embodiment of invention.
Figure 2:
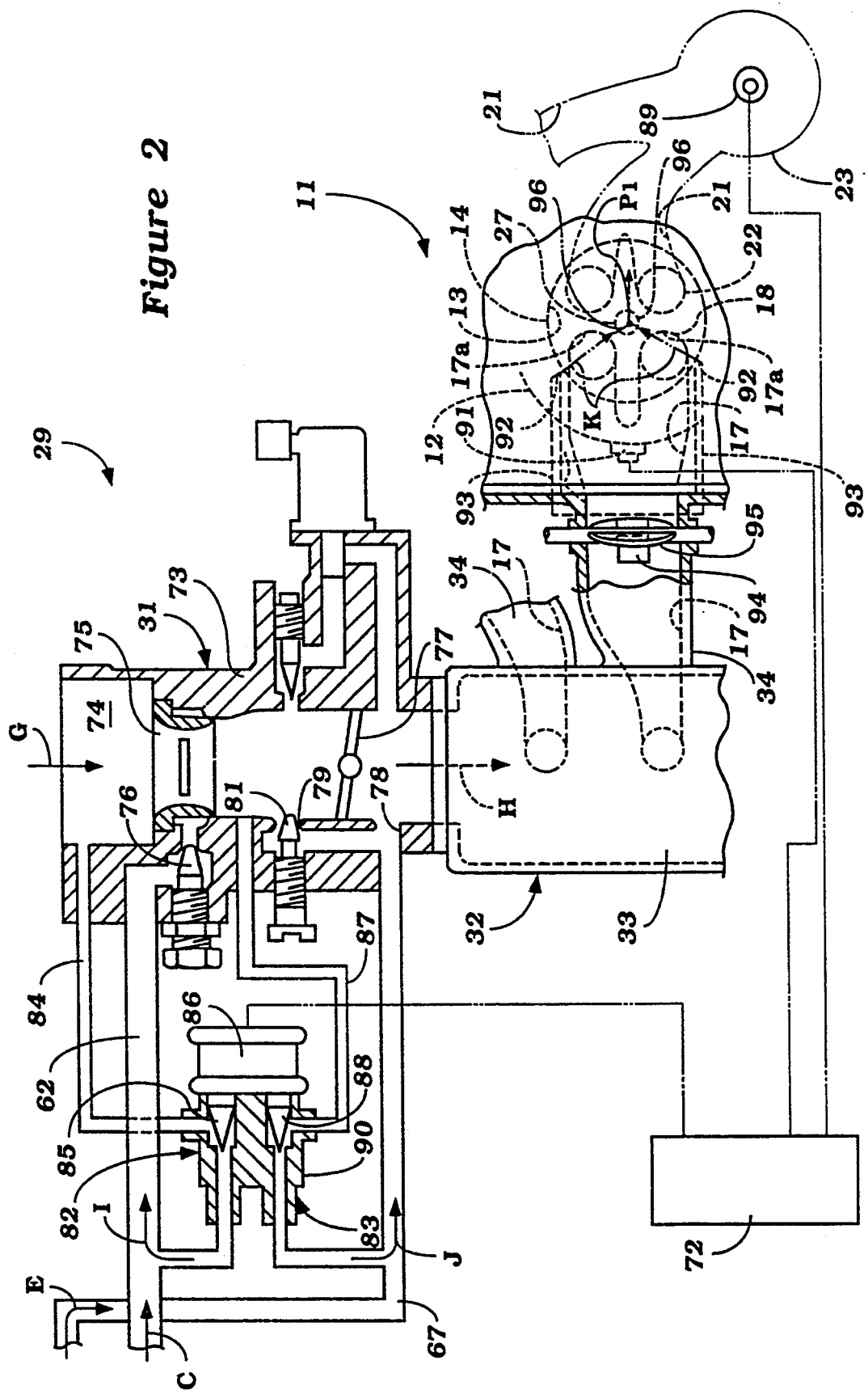
FIG. 2 is a partial top plan view of the engine, with portions of the charge forming system shown in cross section and other components shown schematically.

Referring now in detail to the drawings and initially primarily to FIGS. 1 and 2, an internal combustion engine provided with a fuel supply system constructed in accordance with a first embodiment of the invention is shown partially and identified generally by the reference numeral 11. The engine 11 is only shown partially because the internal details of the engine, except for its induction and charge forming system and the controls therefore, form no part of the invention. However, a portion of the engine 11 is depicted for ease in understanding how the invention may be practiced in conjunction with any known types of internal combustion engines. It also should be noted that the charge forming system is not limited to use in reciprocating engines of the type depicted but may be also employed with rotary type of engines. Also, the invention is described in conjunction with only a single cylinder of a multi-cylinder engine as it is believed that those skilled in the art can readily understand how the invention is practiced in conjunction with multiple cylinder engines and engines of varying configurations.

The engine 11 includes a cylinder block 12 having one or more cylinder bores 13 in which pistons 14 are slidably supported. The pistons 14 are connected in a known manner by connecting rods (not shown) to a crankshaft for providing an output from the engine 11. The cylinder bore 13 and head of the piston 14 form a combustion chamber 15 along with a cylinder head 16 that is affixed in a known manner to the cylinder block 12.

A pair of intake passages 17 extend through one side of the cylinder head assembly 16 and have their communication with the combustion chamber 15 controlled by poppet valves 18 that are slidably supported in the cylinder head 16 in a well known manner. An intake camshaft 19 is rotatably journalled in the cylinder head 16 and operates the intake valves 18 in well known manner.

A siamese exhaust passage 21 extends through the opposite side of the cylinder head 16 from each combustion chamber 15. The flow through the exhaust passage 21 is controlled by poppet type exhaust valves 22 which are also operated by an overhead mounted camshaft (not shown) in a well known manner.

An exhaust manifold 23 is affixed to the exhaust side of the cylinder head 16 and receives the exhaust gases from the exhaust passages 21. An outlet 24 of the exhaust manifold 23 communicates with a catalytic converter 25 having a catalyst bed that includes a so called three-way catalyzer for oxidizing carbon monoxide (CO) and hydrocarbons (HC) while deoxidizing nitrous oxide ($NO_x$) to render the exhaust gases as harmless as possible. The exhaust gases thus treated are then discharged to the atmosphere through an exhaust pipe 26 and appropriate exhaust and muffler system (not shown).

In the illustrated embodiment, the engine 11 is of the four valve per cylinder type (i.e. two intake valves 18 and two exhaust valves 22 per cylinder). Of course, it should be readily apparent to those skilled in the art that certain features of the invention can be employed with engines having other types of valving or porting systems. A spark plug 27 is mounted in the cylinder head 16 and has its spark gap disposed centrally in the combustion chamber 15 for firing the charge therein in a well known manner.

The engine 11 is also water-cooled in the illustrated embodiment and to this end the cylinder block 12 and cylinder head 16 are provided with a cooling jacket or cooling jackets 28 through which liquid coolant is circulated by means of a coolant pump (not shown). This coolant is then passed through an external heat exchanger (not shown) for cooling in a well known manner.

A fuel/air charge is supplied to the combustion chambers 17 by means of an induction and charge forming system, indicated generally by the reference numeral 29 and which includes a charge former in the form of a carburetor 31 which is mounted in the inlet section of an elongated plenum chamber 32 that extends along the intake side of the engine and which is defined by an outer housing 33. A plurality of individual runner sections 34 extend from the housing section 33 to individual manifold runners 35 which supply each of the intake ports 17 of the engine 11.

Figure 3:
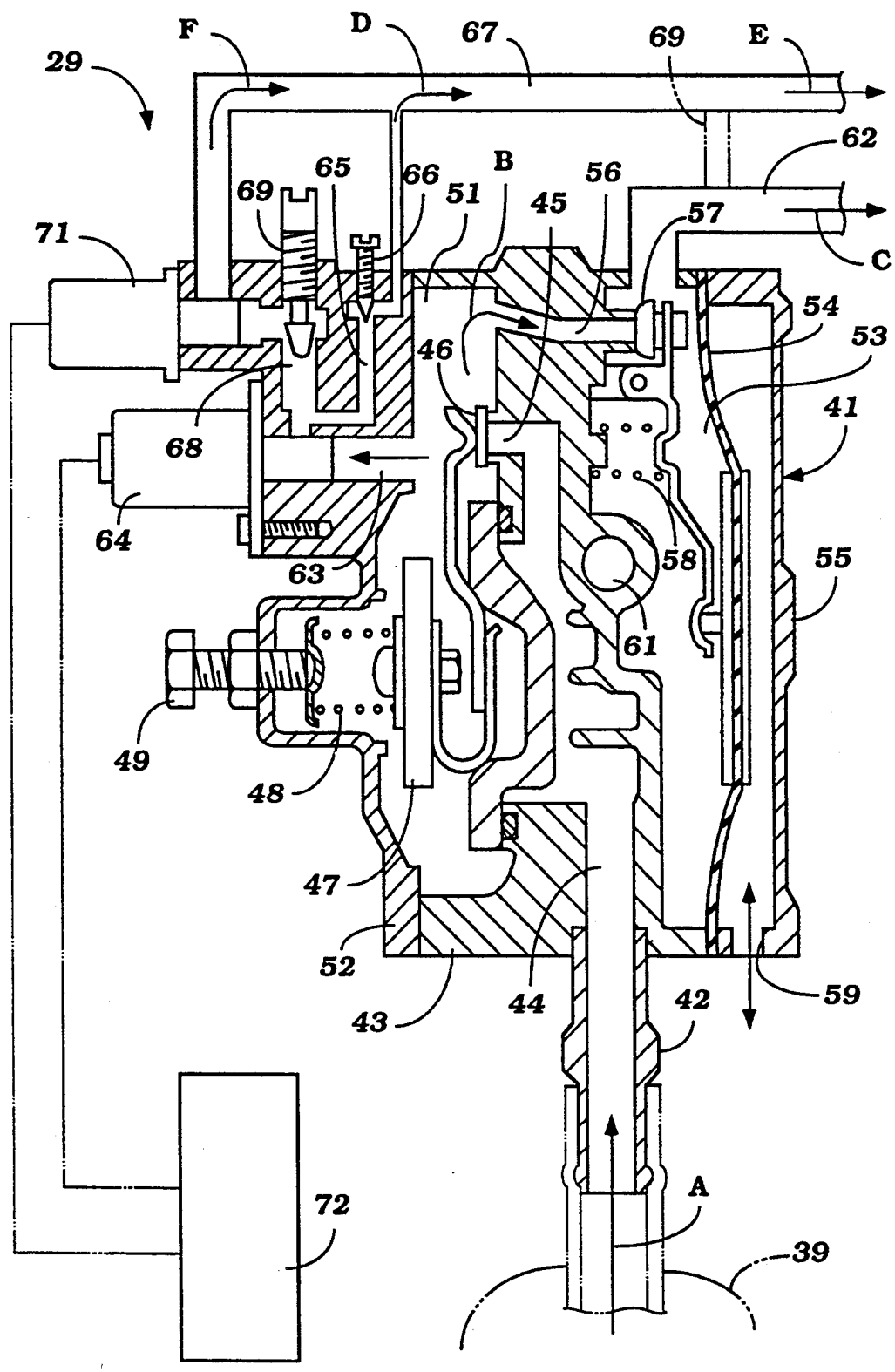
FIG. 3 is an enlarged cross sectional view taken through the pressure regulator of this system.

In accordance with the invention, the engine 11 is fueled with a gaseous fuel that is stored under pressure as a liquid in a pressure source, show in phantom at 39 in FIG. 3. The fuel from the high pressure source 39 is delivered to a pressure regulator, indicated generally by the reference numeral 41 through an inlet conduit 42 of the regulator 41 as shown by the arrow A.

The regulator 41 is comprised of an outer housing assembly including a main body portion 43 in which an inlet passage 44 is formed that communicates with the inlet fitting 42. The passage 44 extends to a first pressure stage regulating port 45 which has its opening and closing controlled by a valve 46 that is operated by an assembly 47 which is biased by a spring 48 having its pre-load adjusted by a screw 49. The valve 46 opens and closes communication with a chamber 51 formed by the housing 43 and a first cover plate 52 so as to reduce the pressure of the gaseous fuel in a first stage to a pressure of about 0.3 Kg/cm$_2$ gage.

The first regulating chamber 51 communicates with a second regulating chamber 53 formed by a cavity in the side of the main housing member 43 opposite the cover plate 52 and which is closed by means of a diaphragm 54 held in place by a second cover plate 55. A passageway 56 communicates the chamber 53 with the chamber 51 and a second pressure regulating valve 57 operated by the diaphragm 54 controls the opening and closing of the passageway 56 so that gas will flow in the direction of the arrow B. A biasing spring 58 acts against the diaphragm 54 and the backside of the diaphragm 54 is opened to atmospheric pressure through an atmospheric port 59 so that the second regulating stage will reduce the pressure of the gaseous fuel in the chamber 53 to just slightly below atmospheric pressure.

The liquid coolant which has been heated in the engine cooling jacket 28 is also circulated through the regulator 41 and to this end there is provided an internal heating passage 61 formed in the main housing 43 which is in communication both with the gas entering the inlet passage 44 and the second regulating chamber 53 so as to maintain a more uniform temperature of the gas in the regulator 41 so as to insure better regulation and better control of the pressure of the gaseous fuel delivered to the charge former 31.

An outlet conduit 62 delivers the two stage pressure regulated gaseous fuel to the main fuel circuit of the carburetor 31 as shown by the arrow C. This main fuel circuit will be described later by reference again to FIG. 2.

Gaseous fuel is also supplied from the regulator 41 to the idle and off-idle circuits of the carburetor 31 but at a slightly higher pressure than the fuel pressure supplied to the main fuel circuit. To accomplish this, a second delivery passage 63 is formed in the cover plate 52 and communicates with the first regulating chamber 51. An electrically operated shut-off valve 64 controls the communication of the passage 63 with a further supply passage 65 formed in the cover 52. A flow controlling needle valve 66 communicates the passage 65 with a conduit 67 which extends to the idle and off-idle circuits of the carburetor 31 in a manner which will be described also by reference to FIG. 2. This idle fuel flow is indicated by the arrow D.

The passage 63 also supplies an enrichment passage 68 formed in the cover plate 52 and in which a flow controlling needle valve 69 is positioned. An electrically operated enrichment valve 71 controls the communication of the passage 68 with the conduit 67 to permit flow as indicated by the arrow F.

A CPU, indicated generally by the reference numeral 72 is provided for controlling the fuel system including the shut-off valve 64 and the enrichment valve 71. The CPU 72 closes the shut-off valve 64 under conditions when the engine is not operating, under extreme deceleration, or in the event of an emergency such as a collision.

The enrichment valve 71 is opened by the CPU 72 under conditions of cold start or acceleration as determined by rapid opening of the throttle valve of the carburetor 31.

Referring now again to FIG. 2, the carburetor 31 includes a main body portion 73 which defines an air horn 74 that receives atmospheric air, indicated by the arrow G, from a suitable air cleaner and/or air silencer (not shown).

A venturi section 75 is formed downstream of the air horn 74 and has fuel discharge openings for discharging gases fuel from the regulator supplied conduit 62. A flow controlling needle valve 76 controls the amount of fuel discharged through the venturi section fuel discharge 75.

A throttle valve 77 is positioned downstream of the venturi section 75 and is controlled by a remote throttle control mechanism, as is well known in this art. The throttle valve 77 communicates directly with the plenum chamber 32, as aforenoted.

The carburetor 31 is also provided with an idle fuel discharge port 78 which is positioned downstream of the throttle valve 77 and an upstream transition port 79 with the flow through this port 79 being controlled by an adjustable needle valve 81. The conduit 67 from the first pressure regulating stage 51 of the pressure regulator 41 supplies the idle port 78 and transition port 79.

Although the needle valves 76 and 81 are supplied for adjusting the fuel/air ratio from the main fuel discharge nozzle 75 and from the transition port 79, these needle valves only give a coarse adjustment and are not adapted to control minute variations to maintain a uniform air/fuel ratio under all running conditions. This is extremely important to the efficient running of the engine and the good operation of the catalytic converter 25. Therefore, a pair of air bleed control valves, indicated generally by the reference numerals 82 and 83 are provided for bleeding air into the main fuel supply conduit 62 and idle fuel supply conduit 67, respectively.

The main fuel air bleed valve 82 receives atmospheric air from the air horn 74 through a conduit 84 and mixes it as shown by the arrow I under the control of a needle valve 85 that is operated by a solenoid operated stepping motor 86. In a like manner, the idle air bleed valve 83 receives atmospheric air from a conduit 87 downstream of the venturi section 75 and delivers it to the idle fuel supply line 67 as shown by the arrow J under the control of a needle valve 88 which, in this embodiment, is also controlled by the same stepping motor 86. The valves 82 and 83 are positioned in a common housing 90 in this embodiment. If desired, the values 82 and 83 may be operated separately by independently controlled stepping motors.

The stepping motor 86 is also controlled by the CPU 72 which receives inputs from an oxygen sensor 89 positioned in the exhaust manifold 23 upstream of the catalytic convertor 25. The CPU 72 also receives an engine temperature signal from an engine temperature sensor 91 for providing the cold starting enrichment control of the enrichment solenoid 71. In addition, a throttle position sensor (not shown) outputs a signal to the CPU 72 for acceleration enrichment. Various other ambient or engine conditions may be supplied to the CPU 72 for also controlling its operation.

Since the air is bled into the main fuel supply conduit 62 and idle supply conduit 67 upstream of the flow controlling needle valves 76 and 81, the air/fuel ratio may be more accurately controlled so as to maintain it in the range of 15.5 ±0.1. As a result, the engine 11 can be operated with extremely good fuel control, fuel economy and exhaust emission control.

The intake ports 17 are disposed so that their discharge ends 17A discharge the intake charge to the combustion chamber 15 in a generally central direction so as to reduce turbulence and flow restriction and permit good volumetric efficiency. However, when this is done there is very little turbulence in the combustion chamber 15 at low speeds and at idle. The lack of turbulence under these running conditions can prevent complete combustion since it has been recognized that turbulence in the combustion chamber is desirable at idle and low speeds in order to insure rapid flame propagation and complete combustion.

Therefore, the intake ports 17 are each provided with auxiliary intake ports 92 that are formed adjacent the port openings 17A but which are disposed on opposite sides thereof as best shown in FIG. 2. The auxiliary intake ports 92 are served by auxiliary intake passages 93 that are formed in the cylinder head 16 and which extend from the intake face thereof to the ports 92. These passages 93 communicate at their inlet ends with a further passage 94 formed in the manifold runners 34. A throttle valve 95 is positioned downstream of the passages 94 in the runners 34 and are controlled either by a vacuum operated servo motor in response to engine load or a linkage system which cooperates with the carburetor throttle linkage system for operating the valves 95 will be closed at low speed and low load conditions and will open as the engine moves to off idle or high speed conditions.

As may be seen in FIG. 2, the auxiliary intake ports 92 are directed generally downwardly and toward each other so that their flow discharges along lines 96 which intersect at a point $P_1$ which is approximately located at the gap of the spark plug 27 but slight below it. Thus, the charge will flow as shown in the direction of the arrow K inwardly and downwardly to strike the head of the piston 14 and then be redirected as shown by the line L in FIG. 1 so as to provide a tumble type of action in the combustion chamber 15.

Because the throttle valves 95 are closed at low speed and low load the charge that enters the combustion 15 will be delivered primarily through the auxiliary intake ports 92 at a high velocity and in the direction as aforenoted. As a result of this, there will be a high turbulence generated in the combustion chamber which will not adversely effect the firing of the spark plug 27 but which will, in fact, cause rapid flame propagation and good and complete combustion at low engine speeds and loads.

As the engine speed and load increases, the throttle valves 95 will be opened and the amount of charge entering through the auxiliary intake ports 92 will be relatively small and hence any turbulence generated will not adversely affect the volumetric efficiency of the engine. In this way, the engine achieves high turbulence at low speeds while, at the same time, not sacrificing volumetric efficiency under higher speed and load conditions.

Figure 4:
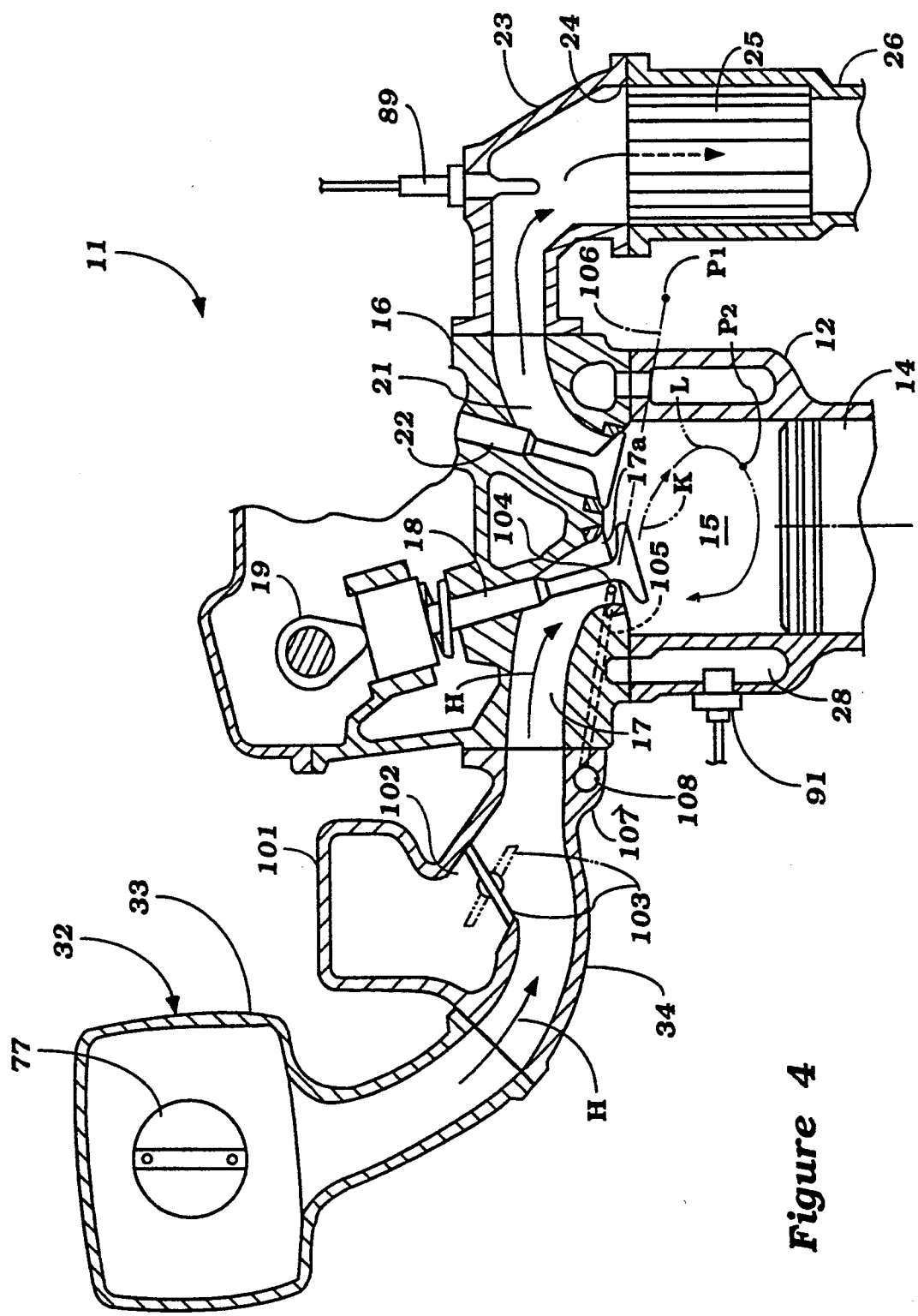
FIG. 4 is a cross sectional view, in part similar to FIG. 1, and shows another embodiment of the invention.
Figure 5:
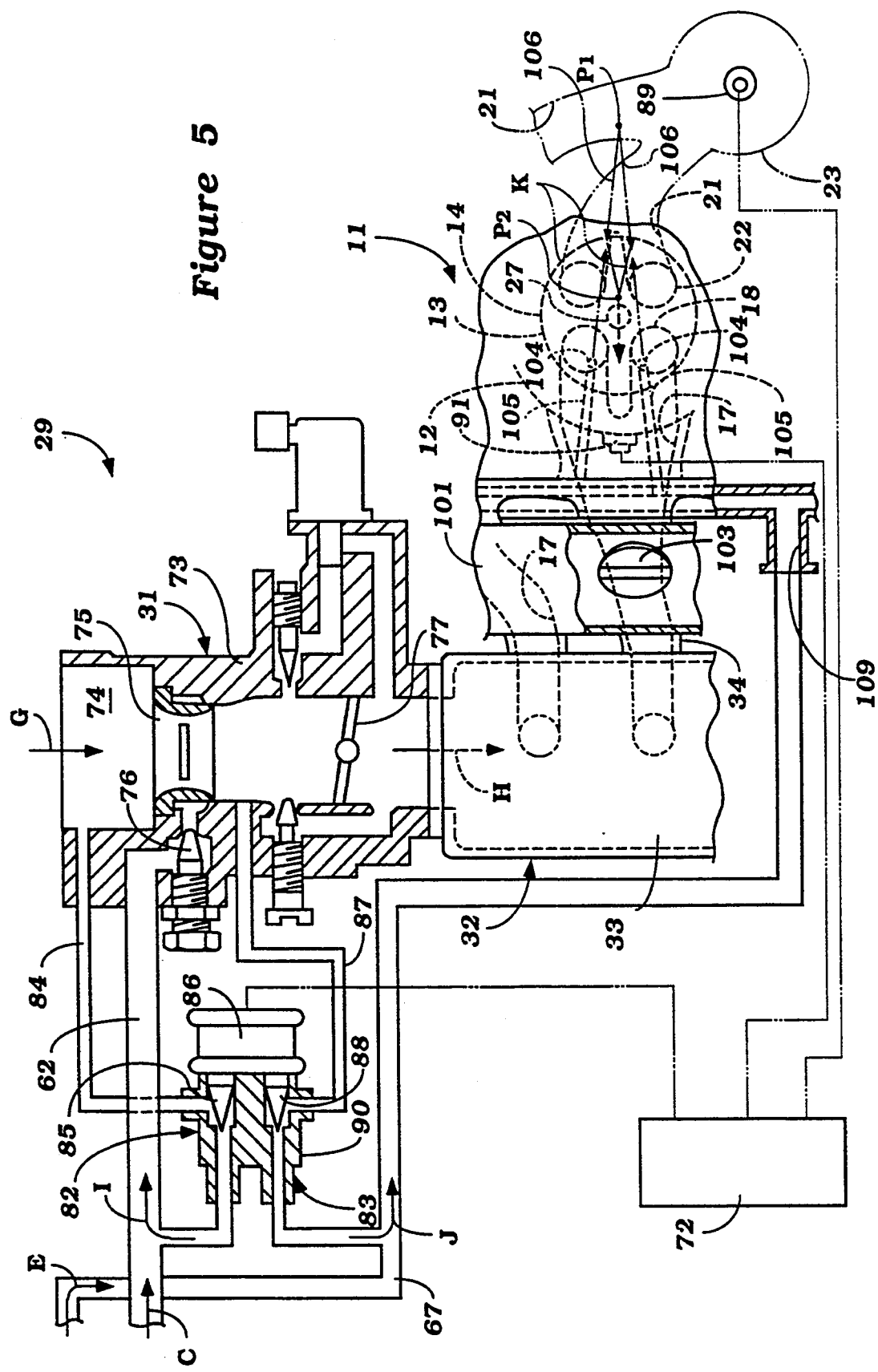
FIG. 5 is a top plan view, in part similar to FIG. 2, and shows the components of this embodiment.

FIGS. 4 and 5 show another embodiment of the invention which is generally similar to the embodiment of FIGS. 1 through 3. For that reason, components which are the same as the previously described embodiment have been identified by the same reference numerals and will be described again only insofar as is necessary to understand the construction and operation of this embodiment.

This embodiment differs from the embodiment of FIGS. 1 through 3 in three regards. First, this embodiment includes, in addition to the main plenum chamber 32, an additional high speed plenum chamber 101 which extends across the upper portions of the manifold runners 34 and communicates with each of them through respective passageways 102 in which throttle valves 103 are positioned. The throttle valves 103 are operated either by a vacuum servo motor or a linkage system so that they will be held in their closed positions when the engine is operating at low and mid range. This closed position is shown in solid lines in FIG. 4. However, as the engine speed and load increases and particularly at high speeds, the throttle valves 103 are moved to the open position as shown in phantom lines. In this position, there will be some high speed tuning as a result of the pulses from the other cylinders, all of which communicate with the plenum chamber 101 so as to further improve high speed charging efficiency.

Another difference between this embodiment and that of FIGS. 1 through 3 is that in this embodiment the carburetor 31 is not provided with any idle or transition circuit but rather the idle transition and enrichment fuel supplies are supplied to the engine through the auxiliary induction system. Also, because of this distinction the throttle valves 95 of the previously described embodiment are not required. Rather, the main throttle valve 77 serves the same purpose.

In this embodiment, auxiliary intake ports 104 are formed at adjacent sides of the main intake ports 17A by means of drilled passageways 105 that extend through the cylinder head from its intake surface. These drilled passageways 105 define lines 106 that intersect as the flow enters the combustion chamber 15 but in this case the intersection is at a point P, which is disposed on the opposite side of the cylinder head and out of the combustion chamber space 15. In this way it is insured that the fuel flow will not wet the spark plug 27. However, there still would be a convergence of the flow and this flow will be deflected by the cylinder bore to a point $P_2$ where contact with the head of the piston 14 will occur and then the flow is turned back in the opposite direction to provide the turbulence and tumble action as with the previously described embodiment. With this construction, the flow paths will not actually intersect until in the vicinity of the spark plug 27 and hence the turbulence generation will have maximum effect.

In this embodiment, the manifold runners 34 are provided with a protuberance 107 in which a cross drilled passageway 108 is formed which is intersected by corresponding extensions of the drilled passageways 105 formed in the manifold runners 34. The conduit 67 which delivers the idle and off-idle fuel as well as the cold starting and acceleration enrichment fuel supplies directly to an inlet 109 of the cross drilled passageway 108. As a result, the idle charge and enrichment charges will be delivered directly to the combustion chamber and hence transient conditions will be more adequately met and the amount of enrichment fuel required will be less. As noted previously, this arrangement also eliminates the need for the throttle valves 95.

Figure 6:
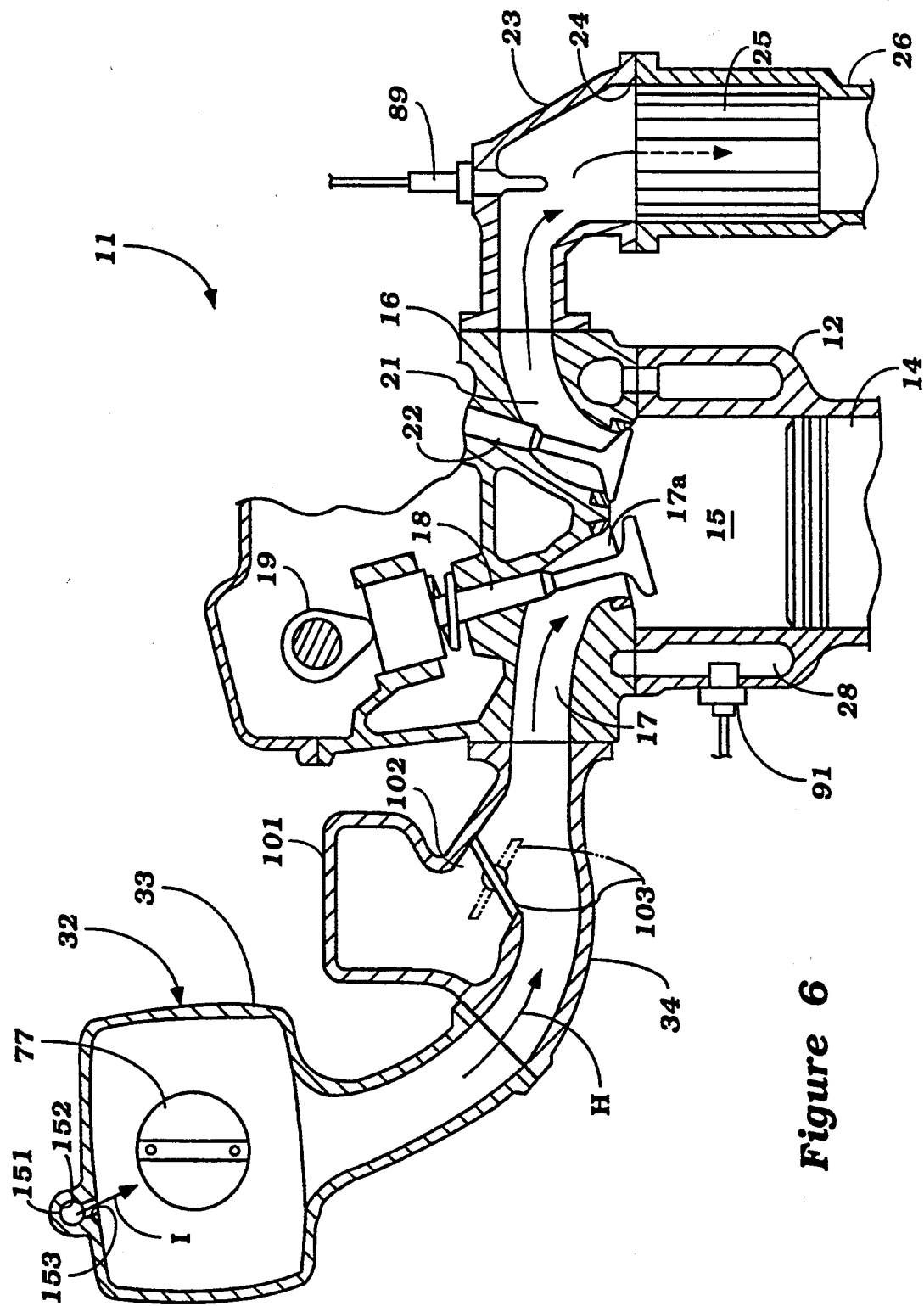
FIG. 6 is a partial cross sectional view, in part similar to FIGS. 1 and 4, and shows a still further embodiment of this invention.
Figure 7:
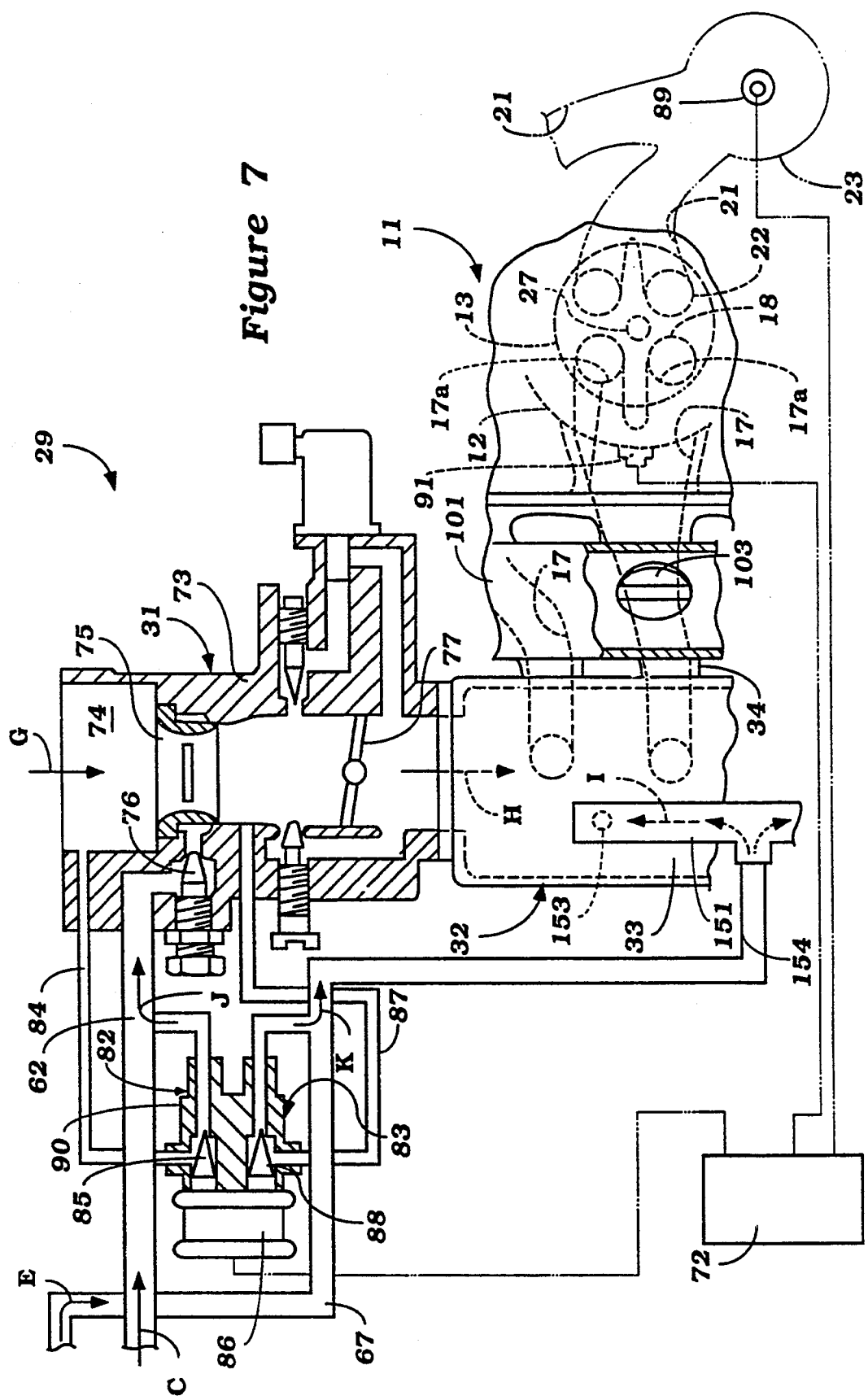
FIG. 7 is a partial top plan view, in part similar to FIGS. 2 and 5, of this embodiment.

FIGS. 6 and 7 show another embodiment of the invention which is generally the same as the embodiment of FIGS. 4 and 5 and, for that reason, components which are the same as that embodiment or as previous embodiments have been identified by the same reference numerals. Again, these common components will not be described again except where necessary to understand the construction and operation of this embodiment.

This embodiment differs from the embodiment of FIGS. 4 and 5 in that the auxiliary intake ports 104, passages 105 and supply conduit 108 are eliminated. In this embodiment, the idle charge of fuel and the enrichment fuel is supplied to the plenum chamber 32 of the main induction system 29 rather than directly to the cylinder head. As a result, this embodiment does not provide the advantages of having the turbulence at low speeds. However, it does have the advantage in simplification of the carburetor 31 in that it does not need idle, off-idle or enrichment circuits. Also, because the charge is delivered directly to the plenum chamber 32, there will be good mixture distribution and there will be no loss of charging efficiency.

In this embodiment, the plenum chamber 77 is provided with an extending ridge 151 through which a transversely extending passage 152 is formed. The passage 152 has a plurality of individual runner sections 153 that intersect it and which discharge into the plenum chamber 32 at spaced locations along its length which correspond to the manifold runners 34.

The conduit 67 from the regulator supplies the charge directly to this small manifold formed by the protrusion 151 through an inlet 154 thereto. As a result, the idle, starting and acceleration enrichment charges will enter as shown in the direction of the arrows I in this figure to achieve good mixing and good mixture distribution.

Figure 8:
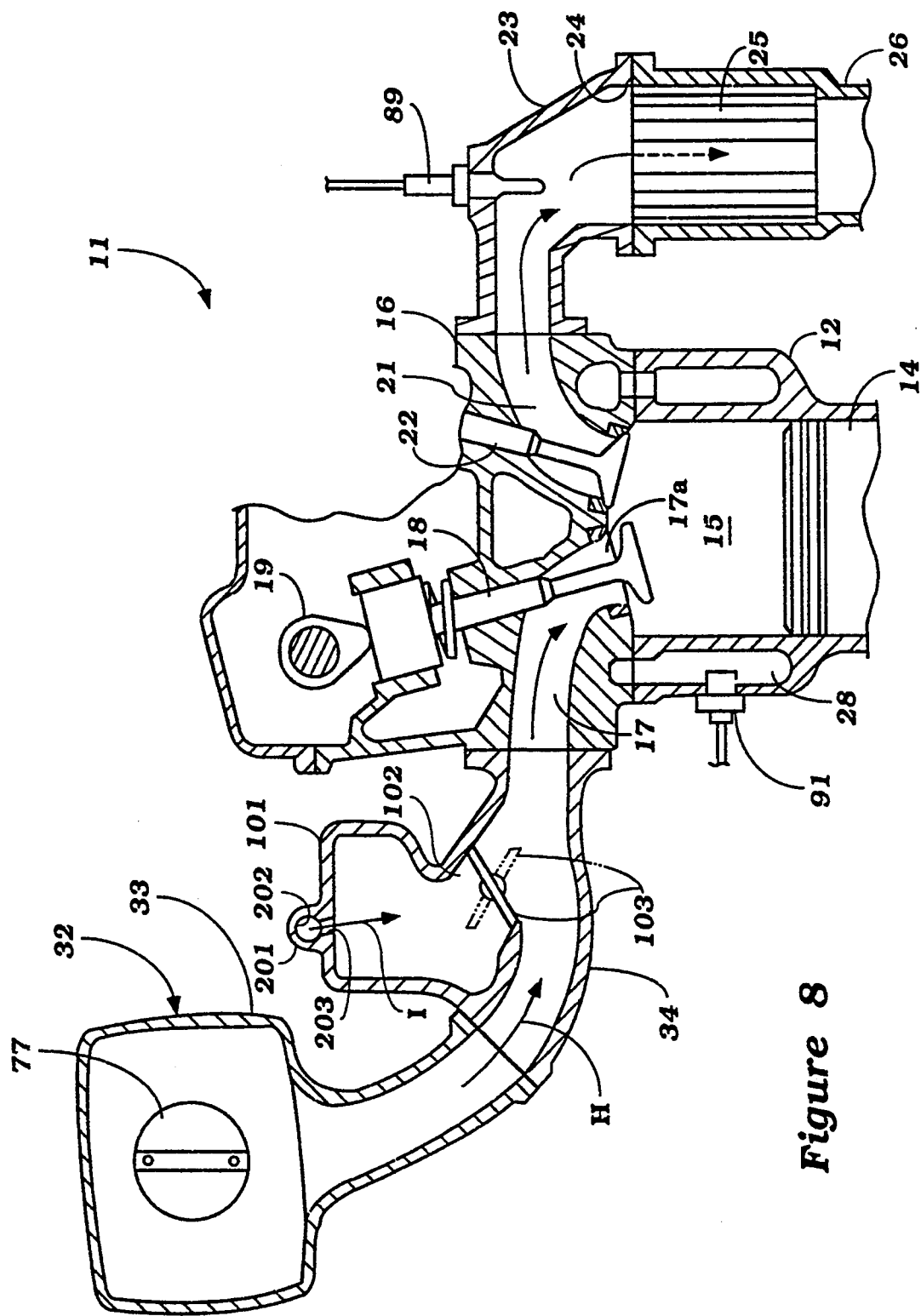
FIG. 8 is a partial cross sectional view, in part similar to FIGS. 1, 4 and 6 and shows yet another embodiment of the invention.
Figure 9:
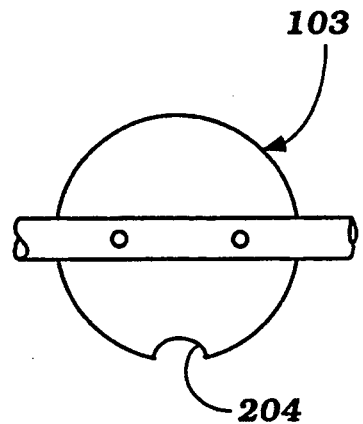
FIG. 9 is an enlarged elevational view of an auxiliary throttle valve that may be employed with the embodiment of FIG. 8.

FIGS. 8 and 9 show another embodiment of the invention which is similar to the embodiment of FIGS. 6 and 7. For that reason, components which are the same as the previously described embodiment or other embodiments have been identified by the same reference numerals. In addition, because of the similarities it is believed that a view corresponding to the view of FIG. 7 is not required as it is believed that the construction will be obvious to those skilled in the art.

In this embodiment, the conduit 67 from the pressure regulator supplies idle and enrichment fuel for starting cold operation and acceleration to a manifold formed by a ridge 201 that extends along the upper surface of the high speed plenum chamber 101. A transversely extending passage 202 is formed in this protrusion and communicates with the high speed plenum chamber 101 through a plurality of discharge ports 203. The discharge ports 203 are aligned with the high speed plenum chamber openings 102 that communicate with the manifold runners 34.

Since the idle charge is delivered to the high speed plenum chamber 101 and since the throttle valves 103 are normally closed under idle and low speed operation, each throttle valve 103 is formed with an arcuate cut-out 204 (FIG. 9) that permits the fuel from the manifold passage 202 and discharge ports 203 to enter the manifold runners 34. Because of the small passage formed by the cut-outs 204, a high speed air flow will result which will add to the turbulence and improve mixture distribution.

Figure 10:
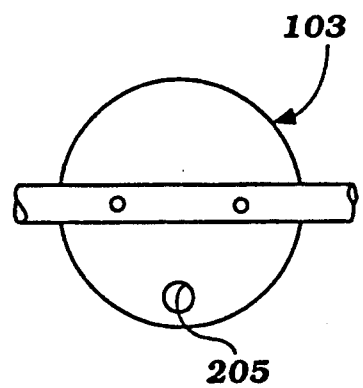
FIG. 10 is an enlarged elevational view, in part similar to FIG. 9, and shows another type of auxiliary throttle valve that may be used with the embodiment of FIG. 8.

Rather than a peripheral cut-out, the valves 103 may be formed with through bores 205 as shown in FIG. 10 which serve the same function of permitting flow of idle and enrichment charge from the high speed plenum chamber 101 into the manifold runner sections 34.

Figure 11:
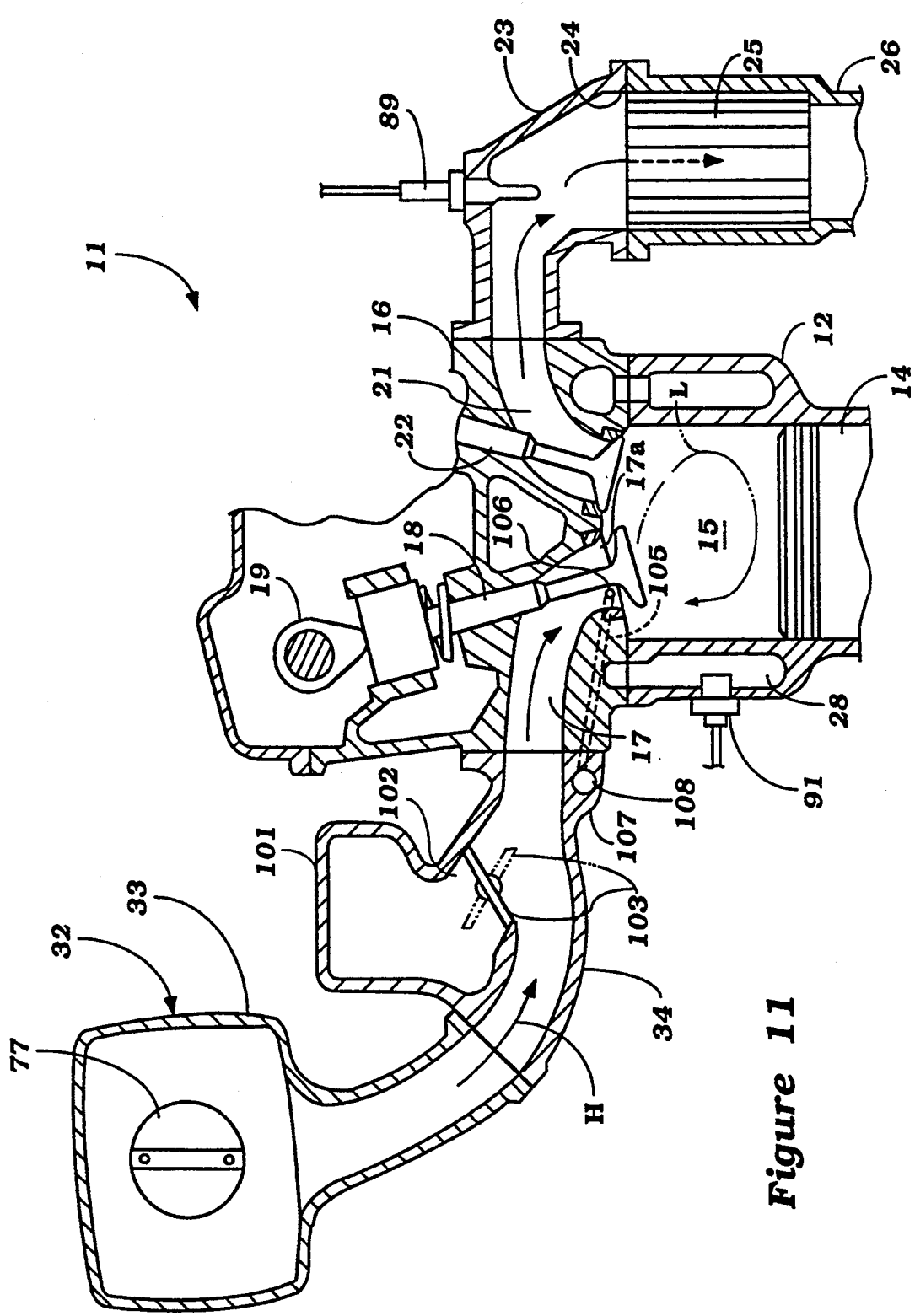
FIG. 11 is a partial cross sectional view, in part similar to FIGS. 1, 4, 6 and 8 and shows yet another embodiment of the invention.
Figure 12:
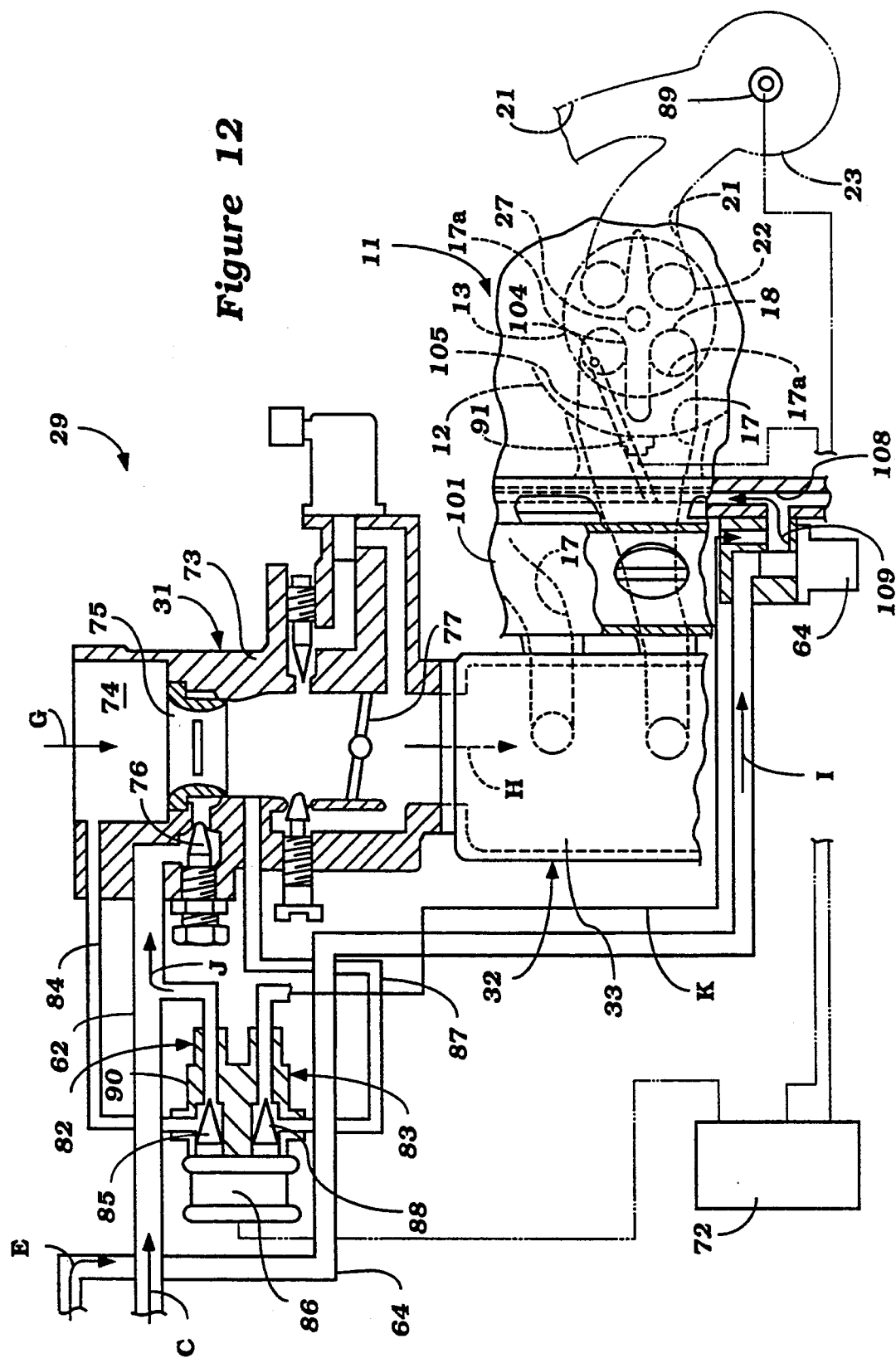
FIG. 12 is a top plan view, similar to FIGS. 2, 5 and 7, for this embodiment.

FIGS. 11 and 12 show another embodiment of the invention and this embodiment is generally the same as the embodiments of FIGS. 4 and 5. For that reason, components of this embodiment which are the same as the embodiment of FIGS. 4 and 5 have been identified by the same reference numerals and will not be described again in detail, except insofar as is necessary to understand the construction and operation of this embodiment.

This embodiment differs from the embodiment of FIGS. 4 and 5 and, for that matter, from all other embodiments in that the shut-off valve 64 of the previously described embodiments, which was incorporated in the regulator 41, is employed not in the regulator 41 but at the point where the conduit 67 communicates the idle and enrichment charges with the inlet 109 to the idle and enrichment discharge passage 108. This valve is shown with the same numerical designation 64 in FIG. 12 and, as noted above, this is the only difference between this embodiment and the previously described embodiments.

It should also be noted that in the embodiments thus far described, there has been provided not only the shut-off valve 64 but also a separate enrichment valve 71. It should be understood that the separate enrichment valve may be deleted if the enrichment function is note desired.

This embodiment also furnishes only one of the main intake ports 17A with an auxiliary intake port 106 and supplying passageway 105. As a result, in this embodiment there will not be as much of a tumble action generated and movement generated within the combustion chamber will be more that of a swirl type action as shown by the arrow L. However, since the passageway 105 and port 106 are directed downwardly, there will be some redirection of the flow upon contact with the piston 14 and some, all be it slight, tulle action will also result. It should be understood that such a different porting arrangement for achieving swirl predominately rather than tumble predominately may be incorporated with any of the previously described embodiments.

Also, it should be noted that this embodiment bleeds the air from the idle air bleed valve 83 into the intake port 109 for the passage 108 rather than into the passageway 64. In any event, however, the air is mixed with the fuel before it is delivered to the combustion chambers 15 so as to control the air/fuel ratio.

Figure 13:
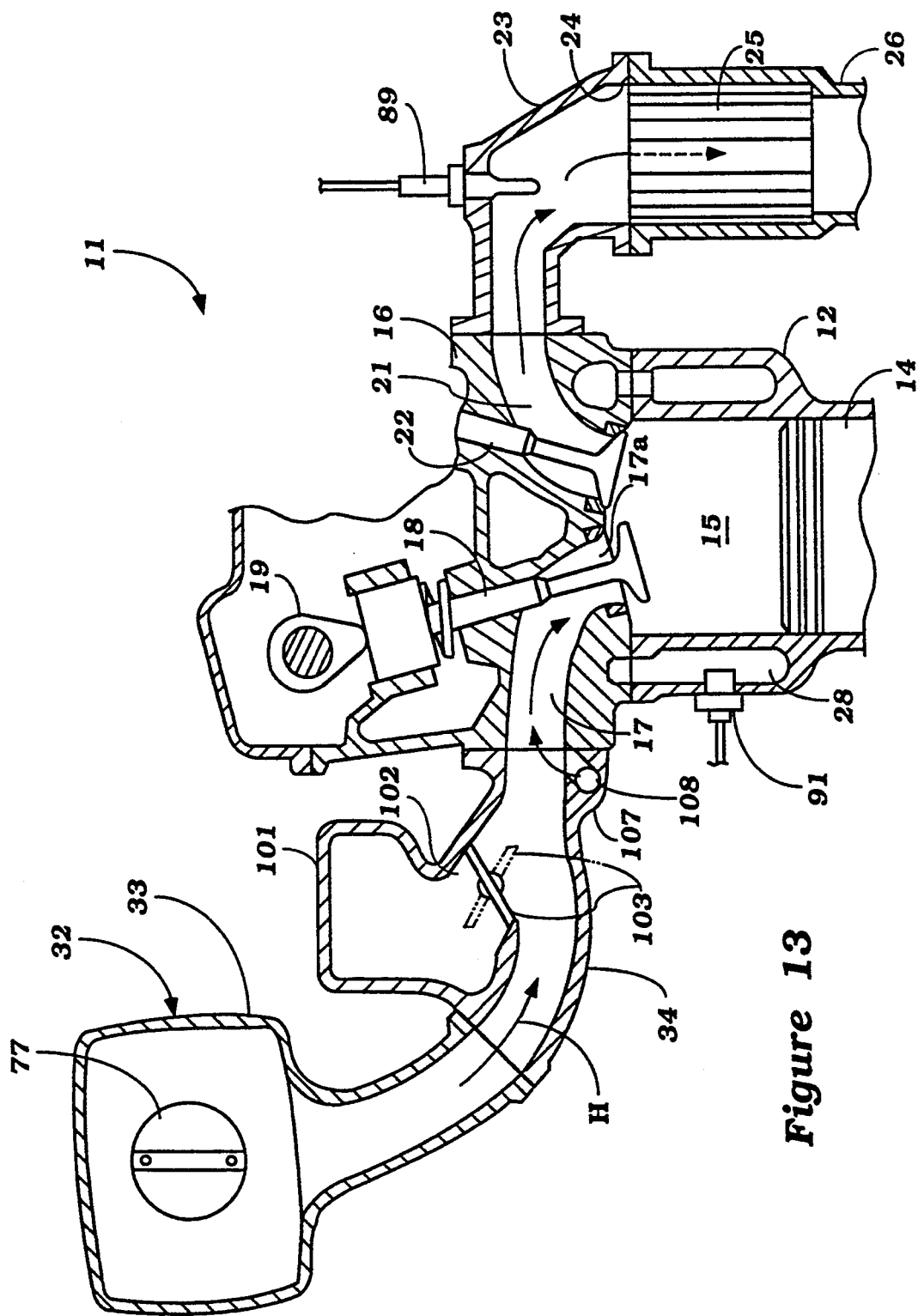
FIG. 13 is a cross sectional view, in part similar to FIGS. 1, 4, 6, 8 and 11, and shows yet another embodiment of the invention.
Figure 14:
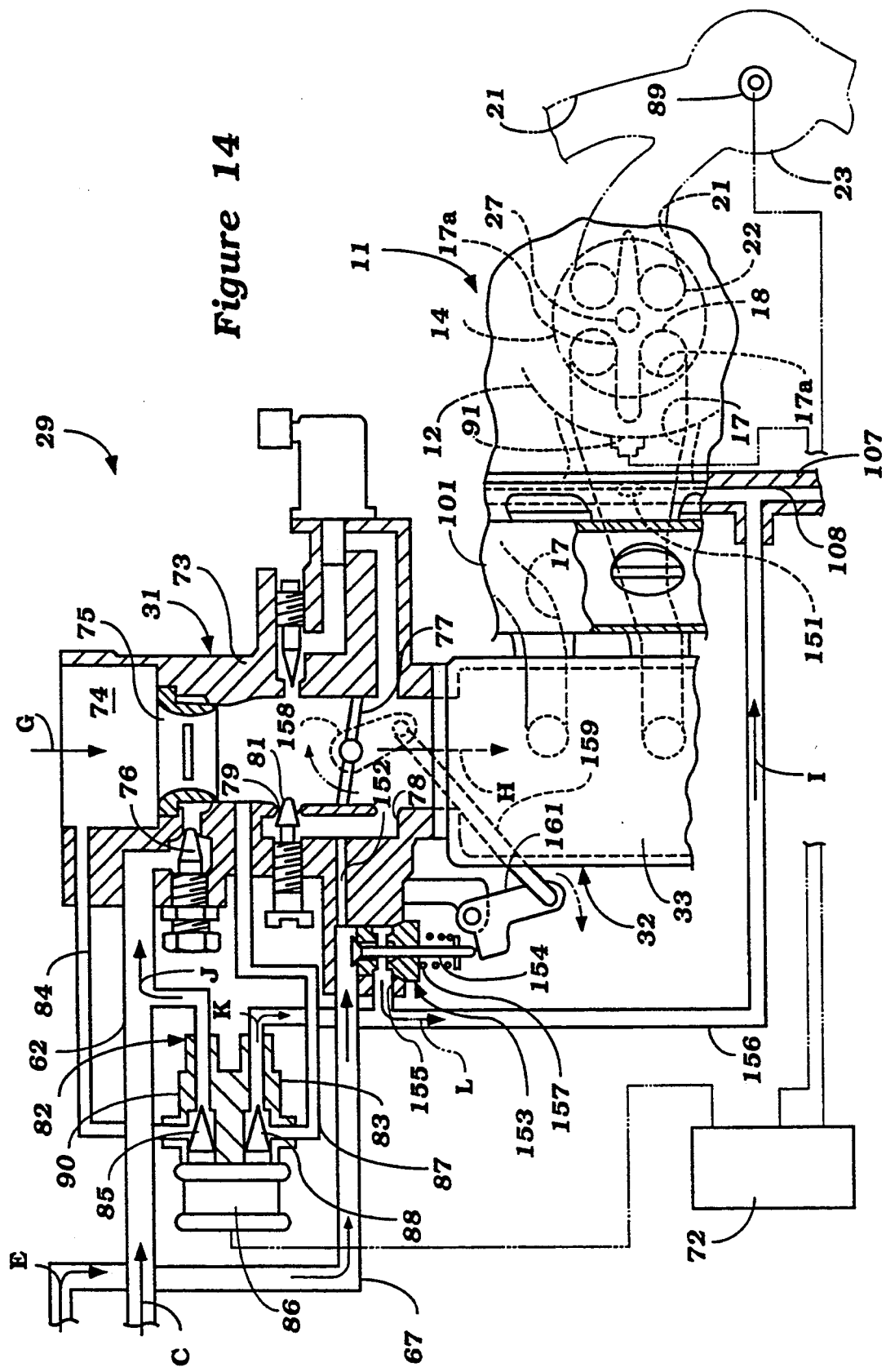
FIG. 14 is a top plan view, in part similar to FIGS. 2, 5, 7 and 12 for this embodiment.

FIGS. 13 and 14 show another embodiment of the invention which is generally similar to the embodiment of FIGS. 4 and 5 but which, unlike that embodiment, also incorporates an idle discharge circuit in the carburetor 31 like the embodiment of FIGS. 1 through 3. For these reasons, components of this embodiment which are the same as the embodiments of FIGS. 4 and 5 or of FIGS. 1 through 3 have been identified by the same reference numerals.

It should be noted that in this embodiment the auxiliary intake ports are comprised of drilled passageways 151 that extend into the manifold runners 34 from the auxiliary passageway 108 formed in the protuberance 107 of the manifold sections 34. The flow from the runners 151 will easily mix with the air charge passing through the intake passages 17 and insure good mixing of the fuel and air.

As may be seen best in FIG. 14, in this embodiment the supply of idle and enrichment fuel from the regulator (not shown) through the line 67 does not have air mixed with it directly so as to control the air/fuel ratio. Rather, this line communicates directly with a small idle air passage 152 formed in the body 73 of the carburetor which intersects the passage forming the idle port 78 and transient port 79. There is, however, provided a valve body, indicated generally by the reference numeral 153 which includes a poppet type valve 154 that controls the communication with a further port 155 formed in the valve body 153 and which intersects a conduit 156 extending from the air bleed valve 83 to the passageway 108. The poppet valve 154 is normally urged to a closed position by a coil compression spring 157.

A linkage system is incorporated that will open the poppet valve 154 when the engine is in off-idle position so as to direct fuel flow through the conduit 156 to the passageway 108 for introduction into the manifold runners 34 through the runners 151.

This linkage system includes a lever 158 fixed to the shaft of the throttle valve 77 and which is connected to one end of a link 159. The opposite end of the link 159 is connected to a further lever 161 pivotally supported upon the body 73 of the carburetor and which engages the end of the poppet valve 154. When the throttle valve 77 is opened, the poppet valve 154 will be urged upwardly against the action of the coil spring 157 and flow will be permitted in the direction I mixed with the air flow K to the manifold runners 34 through the runners 151 from the passageway 108. As a result of this, the air/fuel ratio on off-idle can be easily controlled and the aforenoted advantages will be obtained.

It should be readily apparent from the foregoing description that the described embodiments of the invention each are very effective in providing the desired air/fuel ratio and flow patterns of air introduced to the combustion chamber through the induction system by employing a number of different types of devices for altering the charging characteristics of the induction system. In addition, a tumble action or other types of action may be achieved in the combustion chamber due to the positioning and operation of these charging character devices such as the auxiliary passages. Furthermore, a system is provided wherein the main fuel for the engine is supplied through the carburetor circuit but fuel for other running purposes may be supplied to other portions of the induction system. It should be noted that all of the embodiments illustrated and described refer to the use of gaseous fuel. It should be apparent to those skilled in the art, however, that certain facets of the invention may be employed in conjunction with liquid fueled internal combustion engines. In all events, the foregoing description is that of preferred embodiments of the invention and various changes and modifications may be made without departing from the spirit and scope of the invention, as defined by the appended claims.

I claim:

1. An induction system for a gas fueled internal combustion engine having a combustion chamber, a source of gaseous fuel stored under pressure as a liquid, an induction system for inducting atmospheric air and delivering a charge to said combustion chamber, regulator and charge forming means for changing said fuel from said source into a gaseous form, regulating its pressure and charging said fuel into said induction system for mixture with the air flowing therethrough, and charging augmenting means in said induction system for selectively altering the charging characteristics of said induction system into said combustion chamber.

2. An induction system as set forth in claim 1 wherein the charging augumenting means comprises an auxiliary intake passage cooperating with a main intake passage serving the combustion chamber.

3. An induction system as set forth in claim 2 wherein the auxiliary induction passage and the main induction passage have different orientations.

4. An induction system as set forth in claim 3 further including throttle valve means for controlling the amount of respective flow through the auxiliary and main induction passages.

5. An induction system as set forth in claim 4 wherein the throttle valve means is controlled in response to an engine condition for having the flow through the auxiliary induction passages predominate under certain conditions.

6. An induction system as set forth in claim 5 wherein the engine condition comprises speed.

7. An induction system as set forth in claim 5 wherein the engine condition comprises load.

8. An induction system as set forth in claim 2 wherein the charge forming means comprises a charge forming device having a main fuel discharge.

9. An induction system as set forth in claim 8 wherein the induction system further includes means for delivering fuel to the auxiliary induction passage from the regulator independently of the charge forming device.

10. An induction system as set forth in claim 9 wherein the auxiliary induction passage and the main induction passage have different orientations.

11. An induction system as set forth in claim 10 further including throttle valve means for controlling the amount of relative flow through the auxiliary and main induction passages.

12. An induction system as set forth in claim 9 wherein the regulator regulates a different pressure for the fuel supplied to the main fuel discharge of the charge forming device and the auxiliary induction passage.

13. An induction system as set forth in claim 12 wherein fuel is supplied at a higher pressure to the auxiliary induction passage than to the charge forming device.

14. An induction system as set forth in claim 1 wherein the engine is provided with a pair of main intake passages serving the combustion chamber.

15. An induction system as set forth in claim 14 wherein the charging augmenting means comprises an auxiliary induction passage communicating with at least one of the main induction passages.

16. An induction system as set forth in claim 15 wherein there are a pair of auxiliary induction passages each communicating with a respective one of the main induction passages.

17. An induction system as set forth in claim 16 wherein the flow from the auxiliary induction passages is disposed to move in an intersecting fashion as the charge enters the combustion chamber.

18. An induction system as set forth in claim 17 wherein the flow from the auxiliary induction passages is directed toward the combustion chamber so as to generate a tulle action therein.

19. An induction system as set forth in claim 16 wherein the charge forming means comprises a charge forming device having a main fuel discharge.

20. An induction system as set forth in claim 19 wherein the induction system further includes means for delivering fuel to the auxiliary induction passage from the regulator independently of the charge forming device.

21. An induction system as set forth in claim 20 wherein the regulator regulates a different pressure for the fuel supplied to the main fuel discharge of the charge forming device and the auxiliary induction passage.

22. An induction system as set forth in claim 21 wherein fuel is supplied at a higher pressure to the auxiliary induction passage then to the charge forming device.

23. An induction system as set forth in claim 22 further including throttle valve means for controlling the amount of relative flow through the auxiliary and main induction passages.

24. An induction system as set forth in claim 23 wherein the throttle valve means is controlled in response to an engine condition for having the flow through the auxiliary induction passages predominate under certain conditions.

25. An induction system as set forth in claim 1 wherein the charging augmenting means comprises a plenum chamber communicating with the induction system downstream of the charge forming means and further including throttle valve means controlling the communication of the plenum chamber with the induction system.

26. An induction system as set forth in claim 25 wherein the throttle valve means is controlled in response to an engine condition.

27. An induction system as set forth in claim 26 wherein the engine condition is load.

28. An induction system as set forth in claim 26 wherein the engine condition is speed.

29. An induction system as set forth in claim 25 wherein the engine has multiple combustion chambers and the induction system includes an intake passage serving each combustion chamber and wherein the plenum chamber communicates with all of the intake passages through respective runners.

30. An induction system as set forth in claim 29 further including a plurality of simultaneously operated throttle valves, one for controlling the flow through each of the respective runners and further including means for operating said throttle valves in response to an engine condition.

31. An induction system as set forth in claim 30 wherein the engine condition is load.

32. An induction system as set forth in claim 30 wherein the engine condition is speed.

33. An induction system as set forth in claim 29 wherein the charge forming means comprises a charge former having a main fuel discharge circuit supplied by said regulator and further including means for supplying fuel to the plenum chamber independently of the charge former.

34. An induction system as set forth in claim 33 wherein the fuel is supplied to the plenum chamber from the regulator.

35. An induction system as set forth in claim 34 wherein the fuel supplied to the plenum chamber is regulated to a higher pressure than the fuel supplied to the charge former.

36. An induction system as set forth in claim 33 further including a plurality of simultaneously operated throttle valves, one for controlling the flow through each of the respective runners and further including means for operating said throttle valves in response to an engine condition.

37. An induction system as set forth in claim 36 further including opening means formed in the throttle valves to permit flow from the plenum chamber to the runners when the throttle valves are in their closed positions.

38. An induction system as set forth in claim 1 wherein the induction system includes a plenum chamber for drawing atmospheric air and delivering it to the induction system.

39. An induction system as set forth in claim 38 wherein the charge forming means comprises a charge forming device having a main fuel circuit supplied with fuel from the pressure regulator.

40. An induction system as set forth in claim 39 further including means for delivering fuel from the pressure regulator to the plenum chamber independently of the charge forming means.

41. An induction system as set forth in claim 40 wherein the pressure of fuel supplied to the plenum chamber from the regulator is at a different pressure than the pressure supplied to the charge forming means main fuel circuit.

42. An induction system as set forth in claim 39 wherein the charge forming means discharges fuel directly into the plenum chamber.

43. An induction system as set forth in claim 42 further including means for delivering fuel from the pressure regulator to the plenum chamber independently of the charge forming means.

44. An induction system as set forth in claim 43 wherein the pressure of fuel supplied to the plenum chamber from the regulator is at a different pressure than the pressure supplied to the charge forming means main fuel circuit.

45. An induction system as set forth in claim 1 wherein the charge former has a fuel circuit and a fuel control for controlling the air/fuel ratio.

46. An induction system as set forth in claim 45 further including means for selectively bleeding air into the fuel supplied to the fuel circuit of the charge former upstream of the fuel control to control the amount of fuel supplied to the fuel circuit.

47. An induction system as set forth in claim 46 wherein the amount of air bleed is controlled in response to an engine condition.

48. An induction system as set forth in claim 47 wherein the engine condition comprises oxygen amount in the exhaust gas of the engine.

49. An induction system as set forth in claim 48 further including a catalytic converter positioned in the exhaust system downstream of an oxygen sensor.

50. An induction system for an internal combustion engine having a combustion chamber, at least a pair of main intake ports for delivering a charge to said combustion chamber, and at least a pair of non-parallel auxiliary intake ports each opening into a respective one of said main intake ports for delivering a charge to said combustion chamber through said main intake ports, said auxiliary intake ports being substantially smaller in effective cross sectional area than said main intake ports so that a charge issuing therefrom will enter said combustion chamber at a higher velocity, the discharge paths of said auxiliary intake ports being directed to intersect in the direction of flow into said combustion chamber.

51. An induction system as set forth in claim 50 wherein the charge from the auxiliary intake ports intersects in the combustion chamber before striking a wall defining the combustion chamber.

52. An induction system as set forth in claim 51 further including a spark plug positioned in the combustion chamber at a point contiguous to the point where the flow of the auxiliary intake charge intersects.

53. An induction system as set forth in claim 50 wherein the point of intersection of the auxiliary intake ports lies beyond the combustion chamber on the side opposite where the main intake ports are positioned.

54. An induction system as set forth in claim 53 further including a spark plug positioned in the combustion chamber in an area between the flow of charge from the auxiliary intake ports.

55. An induction system as set forth in claim 50 wherein the engine comprises a reciprocating engine and the intake ports are formed in a cylinder head thereof.

56. An induction system as set forth in claim 55 wherein the charge from the auxiliary intake ports intersects in the combustion chamber before striking a wall defining the combustion chamber.

57. An induction system as set forth in claim 56 wherein the intersection is directed downwardly toward a piston reciprocating in the combustion chamber for creating a tumble action in the combustion chamber.

58. An induction system as set forth in claim 50 wherein the pair of main intake ports are served by a pair of main intake passages extending generally parallel to each other and wherein the main intake ports are disposed in side-by-side relationship to the combustion chamber, the auxiliary intake ports being served by a pair of auxiliary intake passages disposed at least in part in nonparallel fashion adjacent the auxiliary intake ports and entering into the main intake passages at respective sides thereof.

59. An induction and charge forming system for a gaseous fueled internal combustion engine having a combustion chamber, a source of gaseous fuel stored under pressure as a liquid, an induction system for inducting atmospheric air and delivering a charge to said combustion chamber, a charge former in said induction system having a main fuel system and a throttle valve, means for delivering fuel from said source to said main fuel system of said charge former for combustion in said combustion chamber, and means for delivering fuel from said source to said induction system at a location other than said charge former and independently of said charge former.

60. An induction and charge forming system as set forth in claim 59 wherein the charge former has a fuel circuit and a fuel control for controlling the air/fuel ratio.

61. An induction and charge forming system as set forth in claim 60 further including means for selectively bleeding air into the fuel-supplied to the fuel circuit of the charge former upstream of the fuel control to control the amount of fuel supplied to the fuel circuit.

62. An induction and charge forming system as set forth in claim 61 wherein the amount of air bleed is controlled in response to an engine condition.

63. An induction and charge forming system as set forth in claim 62 wherein the engine condition comprises oxygen amount in the exhaust gas of the engine.

64. An induction and charge forming system as set forth in claim 63 further including a catalytic converter positioned in the exhaust system downstream of an oxygen sensor.

65. An induction and charge forming system as set forth in claim 59 wherein the induction system delivers the charge to the combustion chamber through a main intake passage and the other location comprises an auxiliary intake passage intersecting the main intake passage and having a substantially smaller effective cross sectional area.

66. An induction and charge forming system as set forth in claim 65 wherein the main fuel system has a flow control device and further including means for selectively bleedind atmospheric air into the fuel delivered to said main fuel system before said main fuel device for fine tuning the air/fuel ratio.

67. An induction and charge forming system as set forth in claim 66 further including means for selectively bleeding atmospheric air into the fuel delivered to the auxiliary intake passage for controlling the air/fuel ratio delivered to said auxiliary intake passage.

68. An induction and charge foxing system as set forth in claim 67 wherein the amount of air bled to the fuel supplied is varied in response to an engine condition.

69. An induction and charge forming system as set forth in claim 68 wherein the engine condition comprises oxygen amount in the exhaust gas of the engine.

70. An induction and charge forming system as set forth in claim 69 further including a catalytic converter positioned in the exhaust system downstream of an oxygen sensor.

71. An induction and charge forming system as set forth in claim 59 wherein the induction system is provided with a plenum chamber and the fuel supplied at the other location is supplied to the plenum chamber.

72. An induction and charge forming system as set forth in claim 71 wherein the main fuel system has a flow control device and further including means for selectively bleedind atmospheric air into the fuel delivered to said main fuel system before said main fuel device for fine tuning the air/fuel ratio.

73. An induction and charge forming system as set forth in claim 72 further including means for selectively bleeding atmospheric air into the fuel delivered to the plenum chamber for controlling the air/fuel ratio delivered to said auxiliary intake passage.

74. An induction and charge forming system as set forth in claim 73 wherein the amount of air bled to the fuel supplied is varied in response to an engine condition.

75. An induction and charge forming system as set forth in claim 74 wherein the engine condition comprises oxygen amount in the exhaust gas of the engine.

76. An induction and charge forming system as set forth in claim 75 further including a catalytic converter positioned in the exhaust system downstream of an oxygen sensor.

* * * * *